Nov. 21, 1961　　　D. C. ERDMAN　　　3,009,353
ULTRASONIC MEASUREMENT APPARATUS
Filed Jan. 20, 1956　　　　　　　　　　2 Sheets-Sheet 2
*FIG. 1.*　　　*FIG. 2.*　　　*FIG. 3.*
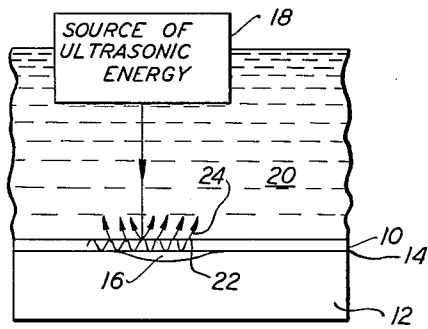
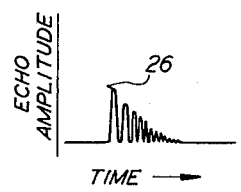
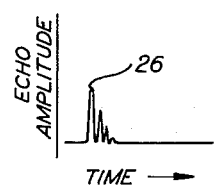
*FIG. 5.*
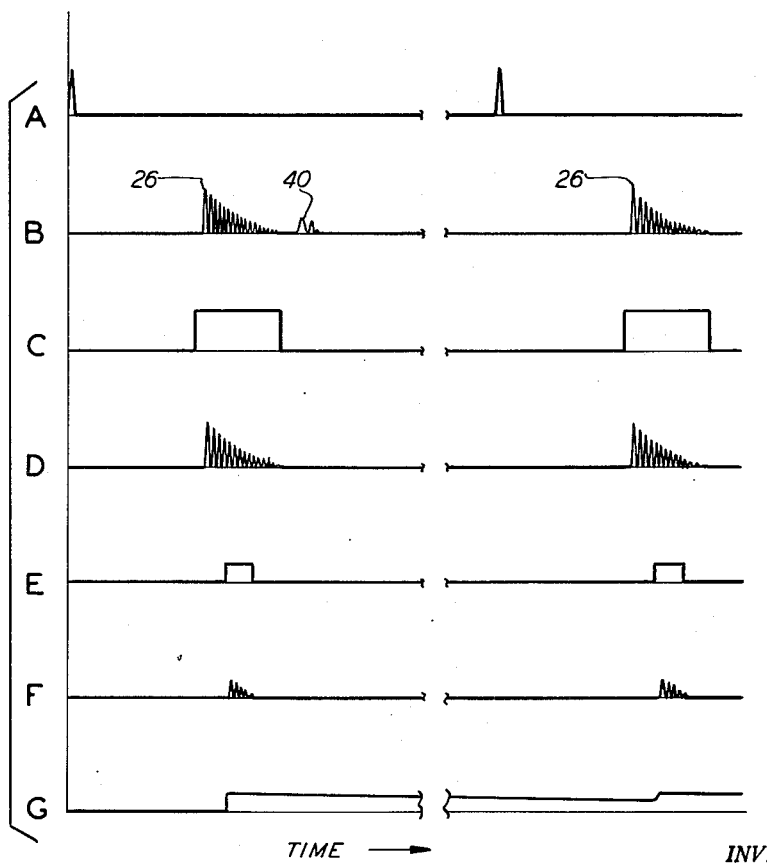
INVENTOR.
DONALD C. ERDMAN
BY
Christie, Parker & Hale
ATTORNEYS United States Patent Office 3,009,353
Patented Nov. 21, 1961

3,009,353
ULTRASONIC MEASUREMENT APPARATUS
Donald C. Erdman, Pasadena, Calif., assignor to Electro-circuits Incorporated, Pasadena, Calif., a corporation of California
Filed Jan. 20, 1956, Ser. No. 560,326
2 Claims. (Cl. 73—67.9)

This invention relates to apparatus for determining the quality of a bond between two members.

In many instances it is desirable to determine whether or not two members are satisfactorily bonded together. By way of example, thin sheet metal is frequently bonded to other types of metal either by a furnace-brazing technique or by the use of resin or plastic cements. There are a number of types of sandwich constructions in which sheet metal is attached to a core of wood, plastic, Fiberglas, or metal which has been formed into honeycombed, ribbed, corrugated or other weight-saving configuration. In order to control the quality of products incorporating such constructions, it is desirable to determine the excellence of the bond between the sheet metal and the core.

The excellence of such bonds has been measured heretofore by ultrasonic apparatus employing a quartz or barium titanate crystal to shake the outer skin of the specimen. By choosing a proper vibrating frequency, the skin can be caused to vibrate in resonance. The power absorbed from the crystal transducer provides a measure of the excellence of resonance, and hence it provides a measure of the quality of the bond. If the outer skin is well bonded to the core material, resonant vibration is difficult to establish because a large part of the ultrasonic energy is absorbed by the core material. In areas where there is a poor bond, the outer skin is backed by air which has very little ability to convey ultrasonic energy or to damp the vibration of the metal skin. Thus, strong resonance effects may be observed in areas where there is a poor bond.

Such arrangements are subject to the disadvantage that a large amount of acoustic coupling is required between the crystal transducer and the target member in order to set up the desired resonant condition. Typical arrangements employ a crystal having a diameter of the order of one-half inch, and the crystal is located adjacent the metal skin which is being examined with a small layer of oil or grease being employed to couple the crystal to the metal skin.

The large area of such crystal transducers makes it impossible to obtain a detailed analysis of the areas where the bonding is poor. When such a crystal transducer is employed in a scanning arrangement, the individual passes of the scanner should be spaced apart about one-fourth inch. Such a scanning arrangement requires that the poorly-bonded area be approximately as large as the diameter of the crystal transducer before it can be detected satisfactorily.

In many instances it is desirable to detect poorly-bonded areas which are much smaller than can be detected by the above-described arrangement. Frequently the poorly-bonded areas have a speckled or scattered distribution, and it is desirable that the individual small specks be detected. In actual practice, it is desirable to scan with passes having a spacing not greater than one-sixteenth inch. In conventional apparatus, this would require a crystal transducer having a diameter which would be too small to provide satisfactory operation of the transducer. Collimating techniques may be employed to reduce the size of the beam of ultrasonic energy, but this requires that the crystal be spaced from the sheet metal which is being examined and the spacing makes it difficult to establish a resonant condition.

A further disadvantage in conventional arrangements for measuring the quality of a bond is that the close coupling between the crystal transducer and the specimen being examined causes a secondary vibration to be established between the crystal and the specimen. This secondary vibration tends to confuse the results which are obtained by such measurement.

These difficulties are overcome in the present invention by employing an ultrasonic transducer which is spaced from the target member being examined and which is coupled to the target member by an acoustic coupling medium such as water. The ultrasonic energy is directed from the transducer toward the target member being examined, the ultrasonic energy which is reflected is detected, and the magnitude of the detected energy is measured at a predetermined time after the initial portion of the reflected energy is detected so as to provide a measure of the reflected energy which is caused by the strength of the multiple reflections caused by the target member. The same result may be achieved by measuring the strength of the multiple reflections which appear to originate at a predetermined distance from the source of ultrasonic energy which is greater than the distance from the source to the outer surface of the member upon which the ultrasonic energy impinges initially. It is preferable that the strength of the multiple reflections be measured at a predetermined number of reflections following the initial echo which is caused by the surface of the target member upon which the energy strikes first. It is also desirable that the measurement of the intensity of the multiple reflections represent the average amplitude of several of the multiple reflections. Since the transducer is spaced from the target member, a collimating arrangement or a focused transducer may be employed with ease.

The invention is explained in detail with reference to the drawings, in which:

FIG. 1 is a simplified drawing illustrating the invention;

FIG. 2 illustrates the video echo pattern which may be obtained from a poorly-bonded skin metal;

FIG. 3 illustrates the video echo pattern that may be obtained from a well-bonded skin metal;

FIG. 5 illustrates the wave forms of signals which are generated in the circuit of FIG. 4, and the letters which are employed to designate the various wave forms are also employed to designate the circuit in FIG. 4 in which these wave forms appear.

Figure 4:
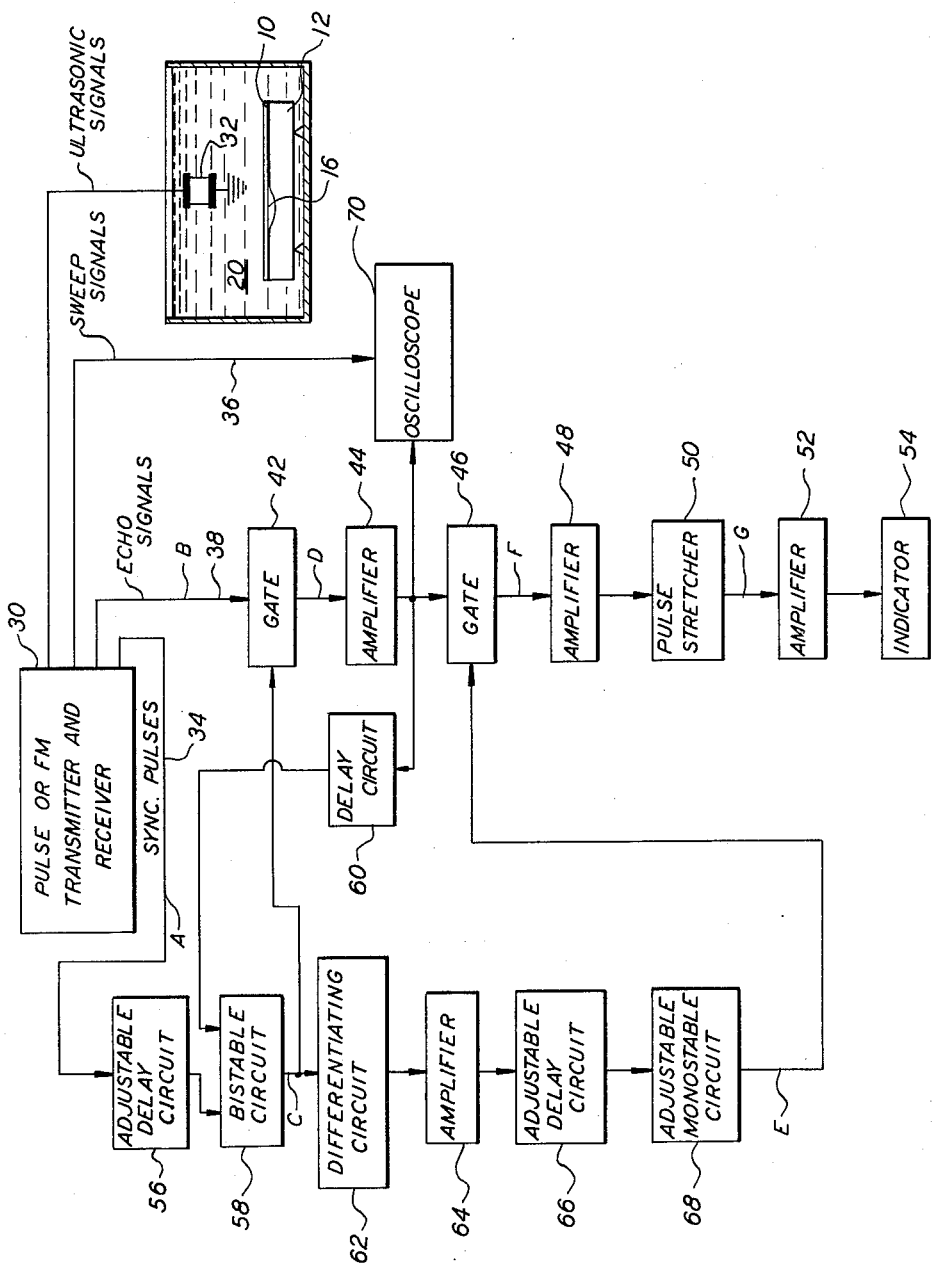
FIG. 4 illustrates one circuit arrangement for practicing the invention.

FIG. 1 illustrates how the video echo pattern may be employed to ascertain the quality of a bond between two members. A thin member 10 is bonded to a base or core member 12 by a suitable bonding layer 14. The members 10 and 12 are not properly bonded in the area 16, and it is desirable to ascertain the location and the size of this poorly-bonded area.

In order to locate the poorly-bonded area, ultrasonic energy is directed toward the outer surface of the thin member 10 from a source 18 through a liquid coupling medium 20. The ultrasonic energy leaving the source 18 will be reflected by any discontinuity along its path. In terms of elapsed time, the first echo will be the energy which is reflected from the top surface of the member 10, and the second echo will be the energy which is reflected from the bottom surface of the member 10. If the bottom surface of the member 10 is well bonded to the member 12, the magnitude of the second echo or reflection will be determined primarily by the difference in the acoustic properties of the two members 10 and 12. Ordinarily the second reflection is relatively small and the energy of the multiple reflections which result is also small. However, if the bond between the members 10 and 12 is poor so that air spaces, poorly cured cement, or the like are located between the two members, a discontinuity will be present, and the second echo and the reflected energy which is caused by multiple reflections will be of relatively large intensity. The latter arrangement is illustrated in FIG. 1 wherein the path of the ultrasonic energy which causes the multiple reflections is indicated by the ray paths 22 and wherein the reflected energy which is caused by the multiple reflections is indicated by the ray paths 24. The ray paths which are shown in FIG. 1 are simplified for the purpose of explaining the invention. In actual practice the ray paths are more complex.

The echo pattern for the situation illustrated in FIG. 1 is shown in FIG. 2 where it can be seen that the reflected energy which is caused by multiple reflections occurs for a substantial time after the occurrence of the initial echo 26 which is caused by the upper surface of the member 10. FIG. 3 illustrates the echo amplitude which might be obtained with the same arrangement but from a well-bonded portion of the two members.

In accordance with the present invention, the quality of a bond is ascertained by measuring the intensity of the reflected energy which is caused by multiple reflections which occur at a predetermined distance from the source or at a predetermined time after the initial reflected echo occurs. This measurement may be effected at a predetermined time or at a selected number of reflections following the echo 26 which is caused by the upper surface of the target member. Preferably the measurement of the intensity of the reflected energy is an average of several of the individual reflections in order to enhance the reliability of the measurement.

In the arrangement illustrated in FIG. 4, a transmitter-receiver circuit 30, sometimes referred to as a flaw detector circuit, applies ultrasonic signals to a crystal transducer 32 which serves to direct the ultrasonic energy toward the upper surface of the target member 10. If desired, a collimating or focusing arrangement may be employed to focus the energy which is emitted from and received by the crystal transducer.

The transmitter-receiver circuit 30 may be a conventional type for detecting flaws in material. The transmitter produces ultrasonic signals, and the signals may be pulse-modulated, frequency-modulated, or phase-modulated. Such transmitters usually provide synchronizing pulses, such as the pulses A which are applied over the circuit 34, for synchronizing the operation of external apparatus with the operation of the transmitter. They also provide sweep signals in synchronism with the synchronizing pulses for actuating an oscilloscope or the like. Such sweep signals may be provided by the circuit 36 of FIG. 4.

The echo signals B which are detected by the transmitter-receiver circuit are provided at the circuit 38 of FIG. 4.

In the wave forms illustrated in FIG. 5, the first echo to be received is the echo 26 which is caused by the upper surface of the member 10. Following the echo 26 is a series of echos of diminishing amplitude which are primarily caused by the poorly-bonded area 16 between the members 10 and 12. The next important signal to be received is the echo 40 which is caused by the bottom of the member 12.

The echo signals B which are detected by the transmitter-receiver circuit 30 are applied through a gate 42 which serves to select out of all the video echo signals only the particular packet of signals of interest. This packet of signals D is applied through an amplifier 44 to another gate 46 which serves to select a predetermined portion F of the packet of signals D. The predetermined portion F of the video signals which is conveyed through the gate 46 is selected at a predetermined time after the initial echo signal 26 which is caused by the upper surface of the member 10 so that the amplitude of the selected signals F are representative of the intensity of the reflected energy which is caused by multiple reflections. It is preferable that each of the portions F of the video signals comprise a plurality of the echo signals which are caused by multiple reflections so as to provide reliable results.

The signals F are applied through an amplifier 48 to a pulse stretcher 50 which provides an output signal G representative of the average amplitude of the signals F. The signals G may then be applied through an amplifier 52 to a suitable indicator 54. This indicator may be a meter, an alarm, a recorder, or the like.

In order to provide signals for actuating the gates 42 and 46, the synchronizing pulses A which are produced by the transmitter-receiver circuit are applied through an adjustable delay circuit 56 to actuate a bistable circuit 58 to one of its stable conditions. The bistable circuit 58 is actuated to its other stable condition by the initial portion of the signals D which are applied through the amplifier 44 and the delay circuit 60 to turn the bistable circuit off. Thus, the bistable circuit 58 serves to produce the gating signals C which cause the gate 42 to pass the packets D of video echo signals.

The gating signals C are also applied to a differentiating circuit 62, and it provides an output signal which corresponds in time to the leading edge of the gating signals C. This output signal is applied through an amplifier 64 and an adjustable delay circuit 66 to actuate a monostable circuit 68. Preferably the delay circuit 66 is adjustable so that the time at which the signals E are produced may be controlled. Also, it is preferable that the monostable circuit 68 be adjustable so that the width of the signals E may be adjusted. The signals E are applied to the gate 46, and they serve to open the gate for the duration of each of the signals E.

If desired, an oscilloscope 70 may be provided for observing the video pattern which is produced either at the output of the amplifier 44 or at the output of the flaw detector circuit 30.

In operation, the delay circuit 56 is first adjusted to select the desired packet of signals. Then the delay circuit 66 and the monostable circuit 68 are adjusted to select a portion of the packet of signals which occurs at a predetermined time after the initial echo. The indicator 54 should provide a substantially constant indication when the ultrasonic energy is directed toward areas of the members 10 and 12 which are well bonded. The indicator 54 will show an increase in the average intensity of the energy when the ultrasonic energy is directed toward poorly-bonded areas.

I claim:

1. An apparatus for locating a defective bond in a specimen comprising two bonded members, one of said members being sufficiently thin in comparison to the thickness of the other member such that multiple reflections from said one member are received before a reflection is received from the back surface of the other member, said apparatus comprising a transducer spaced from a specimen, an acoustical coupling medium disposed between the transducer and the specimen with the outer face of said one member facing said transducer, means coupled to said transducer for pulsing said transducer periodically and transmitting bursts of ultrasonic energy which are directed to and reflected from the interfaces formed between the two bonded members and with the coupling medium, receiver means responsive to the reflected ultrasonic bursts for changing the ultrasonic energy to a corresponding electrical signal, first and second gating means connected in series for connecting the signal from the receiver means to the indicator means only during the time the two gating means are open, adjustable means responsive to the transducer pulsing means for opening the first gating means to pass a signal a selectively delayed time interval following the initiation of an ultrasonic burst, the delay time being adjusted to a value slightly less than the time for an ultrasonic burst to be reflected back from the nearest surface of the specimen, means responsive to an output signal from the first gate for closing the first gate a delayed interval following the first signal passed by the first gate, the delayed interval being less than the transmission time for the ultrasonic energy to pass twice through the specimen, adjustable means responsive to the opening of the first gating means for opening the second gating means a selectively delayed interval following the opening of the first gating means, means responsive to the opening of the second gating means for automatically closing the gating means after an interval of time corresponding to several multiple reflections of ultrasonic energy between the outer surface and bonded surface of the specimen member nearest the transducer, and indicator means responsive to the electrical signal passed by said first and second gating means for indicating the average amplitude of the electrical signal.

2. Apparatus for testing the bond between two laminated pieces where one piece is sufficiently thinner than the other piece such that multiple reflections from said one member are received before a reflection is received from the back surface of the other member, said apparatus comprising means including an ultrasonic transducer facing and spaced from the outer surface of the thinner piece a distance substantially greater than the thickness of said thinner piece for periodically generating a pulse of ultrasonic energy, an acoustic coupling medium between the transducer and the surface of the thinner piece for transmitting the pulse of ultrasonic energy to the laminated pieces, portions of the ultrasonic energy pulse being reflected from the outer surfaces of the laminated pieces and the interface between the laminated pieces, receiving means responsive to ultrasonic energy echo pulses reflected back from the laminated pieces into the coupling medium for generating voltage signals whose peak amplitudes are proportional to the intensity of the reflected ultrasonic echo pulses, means for indicating peak voltage amplitudes, first and second gating means connected in tandem for coupling selected portions of said voltage signals to the amplitude indicating means, means synchronized with said means for periodically generating the pulses of ultrasonic energy for biasing open the first gating means after a delayed interval corresponding to the time the ultrasonic energy pulse takes to travel from the transducer to the surface of the thinner laminated piece and back to the receiving means, means coupled to the output of the first gate and responsive to the initial voltage signal passed by the first gate for again biasing the first gate closed after an interval of time less than the time required for a portion of the ultrasonic energy pulse from the transducer to pass through the two laminated pieces and be reflected back to the receiving means, means for biasing open the second gating means for an interval of time substantially shorter than the interval the first gating means is biased open, and means including a variable delay circuit responsive to the means for biasing open the first gate for actuating said second gate biasing means to open the second gating means a selected interval following the opening of the first gating means.

References Cited in the file of this patent

UNITED STATES PATENTS

| | | |
|---|---|---|
| 2,280,226 | Firestone | Apr. 21, 1942 |
| 2,439,131 | Firestone | Apr. 6, 1948 |
| 2,494,990 | DeLano | Jan. 17, 1950 |
| 2,562,449 | DeLano, Jr. | July 31, 1951 |
| 2,593,865 | Erdman | Apr. 22, 1952 |
| 2,672,392 | Caples et al. | Mar. 16, 1954 |
| 2,682,766 | Van Valkenburg | July 6, 1954 |
| 2,693,105 | Strachl et al. | Nov. 2, 1954 |
| 2,851,876 | Arnold | Sept. 16, 1958 |
| 2,883,860 | Henry | Apr. 28, 1959 |

FOREIGN PATENTS

| | | |
|---|---|---|
| 1,059,948 | France | Nov. 18, 1953 |
| 535,714 | Belgium | June 1, 1955 |